US008542719B2

(12) United States Patent
Lassini et al.

(10) Patent No.: US 8,542,719 B2
(45) Date of Patent: Sep. 24, 2013

(54) SYSTEM AND METHOD FOR MAKING BUSSES LIMITED TO A LINEAR TOPOLOGY EXTENSIBLE TO OTHER TOPOLOGIES

(75) Inventors: Stefano A. Lassini, Lowell, MI (US); Patrick G. Waite, Sand Lake, MI (US); Michael S. Habenschuss, Tucson, AZ (US); Mary Voogt, Grandville, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 733 days.

(21) Appl. No.: 12/162,510

(22) PCT Filed: Feb. 1, 2007

(86) PCT No.: PCT/US2007/002748
§ 371 (c)(1),
(2), (4) Date: Nov. 10, 2008

(87) PCT Pub. No.: WO2007/089896
PCT Pub. Date: Aug. 9, 2007

(65) Prior Publication Data
US 2009/0304052 A1     Dec. 10, 2009

Related U.S. Application Data

(60) Provisional application No. 60/743,208, filed on Feb. 1, 2006.

(51) Int. Cl.
*H04B 3/36* (2006.01)
(52) U.S. Cl.
USPC ............ 375/211; 375/219; 375/295; 375/316

(58) Field of Classification Search
USPC ................. 375/211, 142, 219; 455/15, 73; 710/100
See application file for complete search history.

(56) References Cited

U.S. PATENT DOCUMENTS

| 4,837,788 | A | * | 6/1989 | Bird | 375/211 |
| 5,703,883 | A | * | 12/1997 | Chen | 375/211 |
| 2004/0056666 | A1 | | 3/2004 | Gohel | |

FOREIGN PATENT DOCUMENTS

| EP | 1439665 A | 7/2004 |
| JP | 11-259381 A | 9/1999 |

(Continued)

OTHER PUBLICATIONS

Unofficial translation of JPO Office Action from corresponding JP Application No. 2008-553353, Sep. 27, 2012.

(Continued)

*Primary Examiner* — Shuwang Liu
*Assistant Examiner* — Ross Varndell
(74) *Attorney, Agent, or Firm* — Global Patent Operation

(57) ABSTRACT

A communication system and method includes a main bus that operates in accordance with a standard limited to a linear topology, a bus controller coupled to the main bus and configured to send and receive messages on the main bus, and a first remote terminal coupled to the main bus and configured to send and receive messages on the main bus including the messages sent by the bus controller. The system and method also includes a repeater coupled to the main bus and configured to send and receive messages on the main bus including the messages sent by the bus controller and by the first remote terminal, and second and third remote terminals coupled to the repeater, wherein the second and third remote terminals send and receive messages on the main bus via the repeater.

14 Claims, 6 Drawing Sheets

(56) References Cited

FOREIGN PATENT DOCUMENTS

| | | |
|---|---|---|
| JP | 2001-290761 A | 10/2001 |
| JP | 2004-242293 A | 8/2004 |
| KR | 2005-0048595 A | 5/2005 |

OTHER PUBLICATIONS

Unofficial English translation of Korean Office Action from corresponding KR Application No. 2008-7021269 dated Feb. 20, 2013.

* cited by examiner

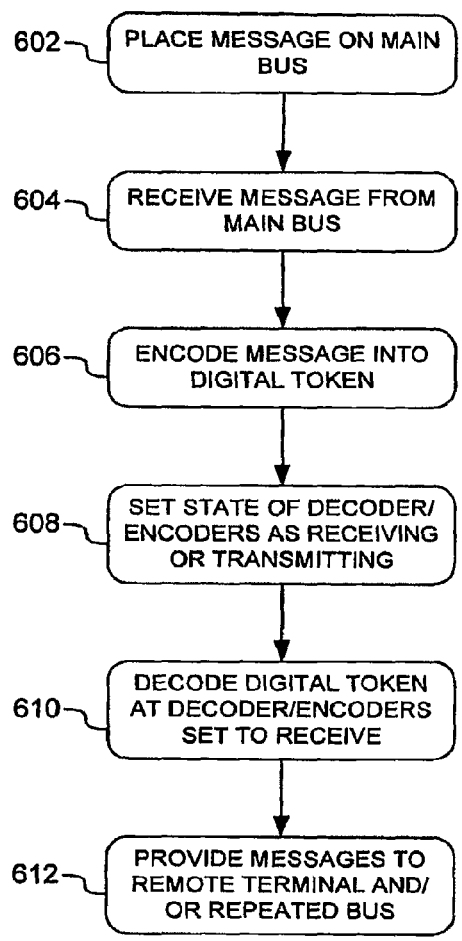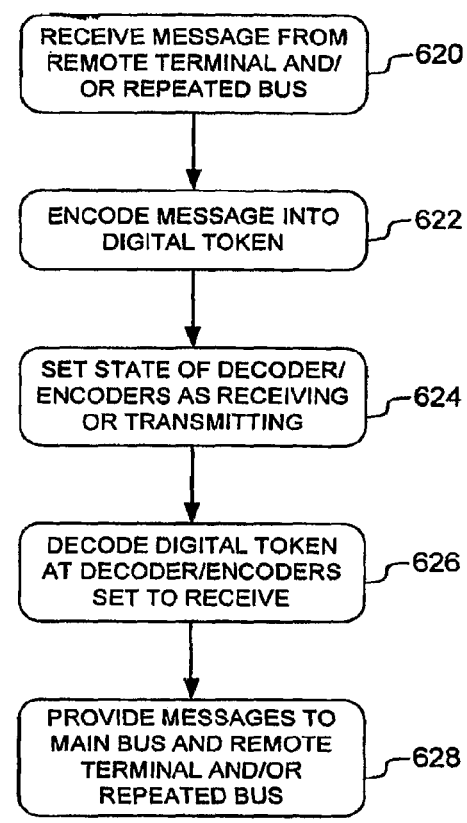
FIG. 6A
FIG. 6B

SYSTEM AND METHOD FOR MAKING BUSSES LIMITED TO A LINEAR TOPOLOGY EXTENSIBLE TO OTHER TOPOLOGIES

CROSS-REFERENCE TO RELATED APPLICATIONS

This is a national stage application under 35 U.S.C. §371 of prior-filed, co-pending International Application No. PCT/US2007/002748, filed Feb. 1, 2007, which claims the benefit of U.S. Provisional Application No. 60/743,208, filed Feb. 1, 2006.

FIELD OF THE INVENTION

The present invention relates generally to bus communication and, more particularly, to a system and method for making busses limited to a linear topology extensible to other topologies.

BACKGROUND OF THE INVENTION

MIL-STD-1553 is military standard published by the United States Department of Defense that defines the mechanical, electrical and functional characteristics of a serial data bus. It was originally designed for use with military avionics, but has also become commonly used in spacecraft on-board data handling (OBDH) subsystems, both military and civil. It features a dual redundant balanced line physical layer, a (differential) network interface, time division multiplexing, half-duplex command/response protocol and up to 31 remote terminals (devices).

A single bus consists of a wire pair with 70-85Ω impedance at 1 MHz. Transmitters and receivers couple to the bus via isolation transformers, and stub connections branch off using a pair of isolation resistors and a coupling transformer. This configuration reduces the impact of a short circuit and assures that the bus does not conduct current through the aircraft. A Manchester code is used to present both clock and data on the same wire pair and to eliminate any DC component in the signal (which cannot pass the transformers). The bit rate is 1.0 megabit per second (1 bit=1 μs).

Messages consist of one or more 16-bit words (command, data or status). Each word is preceded by a 3 μs sync pulse (1.5 μs low plus 1.5 high, which cannot occur in the Manchester code) and followed by an odd parity bit. The words within a message are transmitted contiguously and there is a 4 μs gap between messages. Devices have to start transmitting their response to a valid command within 4-12 μs and are considered to not have received a message if no response has started within 14 μs.

All communication on the bus is under the control of a master bus controller and is on the basis of a command from the master controller to a terminal (also referred to as a remote terminal (RT)) to receive or transmit. The sequence of words for transfer of data from the master controller to a terminal (in the format of sender.word-type(receiver)) is master.command(terminal)→terminal.status(master)→master.data(terminal)→master.command(terminal)→terminal.status(master). The sequence of words for terminal to terminal communication is master.command(terminal_1)→terminal_1.status(master)→master.command(terminal_2)→terminal_2.status(master)→master.command(terminal_1)→terminal_.data(terminal_2)→master.command (terminal_2)→terminal_2.status(master). The sequences ensure that the terminal is functioning and able to receive data. The status request at the end of a data transfer sequence ensures that the data has been received and that the result of the data transfer is acceptable. It is this sequence that gives MIL-STD-1553 its high integrity. The above sequences are simplified and do not show the actions to be taken in the case of an error or other fault.

A terminal device cannot originate a data transfer of itself. Requests for transmission from terminal devices are handled by the master controller polling the terminals. Higher-priority functions (for example, commands to the aircraft control surfaces) are polled more frequently. Lower-priority commands are polled less frequently. However, the standard does not specify any particular timing for any particular word, that's up to the system designers. The absence of a response when a device is polled indicates a fault.

As shown in FIG. 1, a conventional MIL-STD-1553 bus system includes a dual-redundant Mil-Std-1553 bus 14, a bus controller 10, up to thirty-one remote terminals 12 (three remote terminals 12 are represented in FIG. 1), and an optional bus monitor 16. There is only one bus controller 10 in any Mil-Std-1553-based system, and it initiates all message communication over the bus. The bus controller 10 operates according to a command list stored in its local memory, commands the various remote terminals 12 to send or receive messages, and services any requests that it receives from the remote terminals 12. The bus controller 10 also detects and recovers from errors and keeps a history of errors A remote terminal 12 can be used to provide an interface between the Mil-Std-1553 bus 14 and an attached subsystem. For example, in a tracked vehicle, a remote terminal 12 might acquire data from an inertial navigational subsystem, and send that data over the Mil-Std-1553 bus 14 to another remote terminal 12, for display on a crew instrument. Simpler examples of remote terminals 12 might be interfaces that switch on the headlights, the landing lights, or the annunciators in an aircraft.

The bus monitor 16 cannot transmit messages over the data bus. Its primary role is to monitor and record bus transactions, without interfering with the operation of the bus controller 10 or the remote terminals 12. These recorded bus transactions can then be stored, for later off-line analysis. Ideally, a bus monitor 16 captures and records all messages sent over the Mil-Std-1553 bus 14. However recording all of the transactions on a busy data bus might be impractical, so a bus monitor 16 is often configured to record a subset of the transactions, based on some criteria provided by the application program. Alternatively, a bus monitor 16 is used in conjunction with a back-up bus controller. This allows the back-up bus controller to immediately become operatively effective if it is called upon to become the active bus controller 10.

When components are disconnected from the Mil-Std-1553 bus 14, or an equivalent bus, (resulting in an unterminated remote terminal, or open port), interference is created in the bus. For example, in the scenario where the bus 14 is used to communicate with stores on board an aircraft, such as ordinance (e.g., missiles) carried on an aircraft, and the ordinance is utilized (e.g., fired, dropped, etc.), there is a connector (previously connected to the missile) that is no longer connected to anything. As a result, signals sent down the bus 14 to this connector may propagate or reflect back along the bus 14 upon reaching the open connector, creating interference.

Conventionally, Mil-Std-1553 Data bus systems are limited to a linear topology. In other words, a non-linear topology, such as a star topology or a parallel topology, is not compatible with a 1553 bus system. As a result, the 1553 system is not compatible, for example, with the use of a carriage system of deploying weapons in which a single carriage store interface (CSI) on the bus 14 is used to communicate with multiple weapons or a single CSI on the bus is used to communicates with multiple remote terminals 12. Thus, a one-to-more than one or a one-to-many connection topology is not compatible with the conventional 1553 system or its equivalents.

SUMMARY OF THE INVENTION

According to an aspect of the invention, communication system and method includes a main bus that operates in accordance with a standard limited to a linear topology, a bus controller coupled to the main bus and configured to send and receive messages on the main bus, and a first remote terminal coupled to the main bus and configured to send and receive messages on the main bus including the messages sent by the bus controller. The system and method also includes a repeater coupled to the main bus and configured to send and receive messages on the main bus including the messages sent by the bus controller and by the first remote terminal, and second and third remote terminals coupled to the repeater, wherein the second and third remote terminals send and receive messages on the main bus via the repeater.

Further features, aspects and advantages of the present invention will become apparent from the detailed description of preferred embodiments that follows, when considered together with the accompanying figures of drawing.

BRIEF DESCRIPTION OF THE DRAWINGS

FIGS. 6A and 6B are flow diagrams of processes for coupling messages between the main bus and remote terminals and repeated busses coupled to the main bus via a repeater, consistent with the present invention.

DETAILED DESCRIPTION OF PREFERRED EMBODIMENTS

Figure 1:
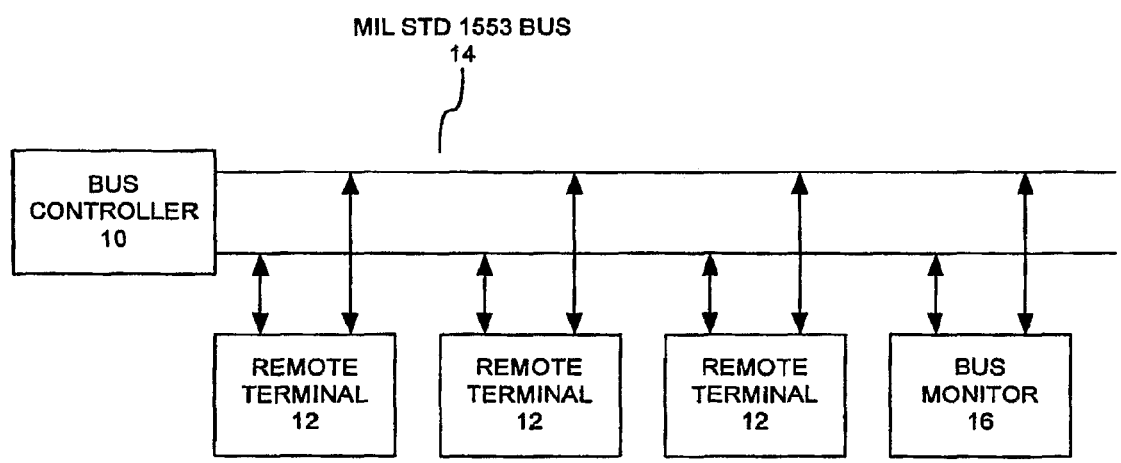
FIG. 1 is a block diagram of a conventional MIL-STD-1553 bus system.
Figure 2:
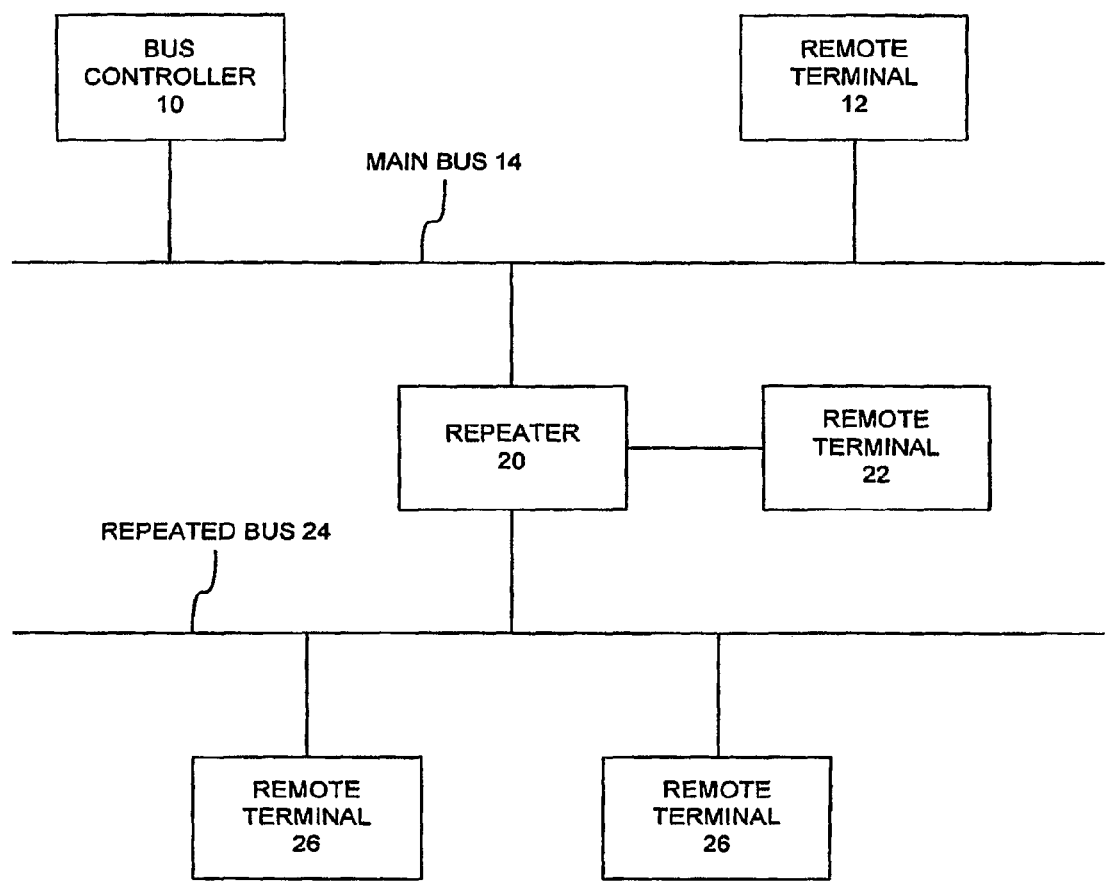
FIG. 2 is a block diagram of a bus system limited to a linear topology made extensible to a non-linear topology consistent with the present invention.

FIG. 2 is a block diagram of a bus system limited to a linear topology made extensible to a non-linear topology consistent with the present invention. As shown in FIG. 2, like the bus system of FIG. 1, a bus controller 10 and a remote terminal 12 are each coupled to a main bus 14. Although only a single remote terminal 12 is shown, it should be understood that several more remote terminals 12 can be coupled to the main bus 14. The main bus 14 is preferably configured in accordance with Mil-Std-1553, but can also be configured according to another standard that limits the configuration to a linear topology. In addition, other elements, such as a bus monitor (not shown), can also be coupled to the main bus 14.

As further shown in FIG. 2, a repeater 20 is also coupled to the main bus 14. The repeater 20 is transparent to the bus controller 10. When the main bus 14 is configured in accordance with Mil-Std-1553, each remote terminal is associated with a five-bit fixed address. Since each element that can be addressed by the bus controller 10 has a different address, and address 31 (binary 11111) is reserved for broadcast communication, the total number of elements that can be controlled by bus controller 10 is preferably limited to thirty-one. The repeater 20 does not require a fixed address, and thus need not be addressable by bus controller. As described herein, a command interface can be coupled directly to the repeater 20 and configured to test the repeater 20 and other elements in the bus system.

The repeater 20 enables the main bus 14, which is configured in accordance with a standard limited to a linear topology, to be extensible to a non-linear topology. This extensibility includes enabling the repeater 20 to be connectable to a remote terminal 22 as well as a repeated bus 24. Although only one remote terminal 22 is shown as being connected to the repeater 20, it should be understood that more than one remote terminal 22 can be connected to the repeater 20. The repeated bus 24 is preferably configured in accordance with the same standard as the main bus 14, such as Mil-Std-1553. The repeated bus 24, like main bus 14, also can have remote terminals 26 coupled to it. It is also possible to have only one remote terminal 26 or more than two remote terminals 26 coupled to the repeated bus 24.

The repeater 20, as will described herein, is configured to provide messages to each of the elements that are connected to the main bus 14 through the repeater. The repeater 20 can be implemented in hardware and/or software. For example, the repeater 20 can include a processing unit, such as a CPU, microprocessor or microcontroller, as well as volatile and/or non-volatile memory storing instructions executed by the processing unit to perform the functions of the repeater 20. In one implementation, the repeater 20 can be implemented with a Field Programmable Gate Array (FPGA).

Communications in the bus system of FIG. 2 typically begin with a message sent from the bus controller 10. The message preferably includes the address of the element of the bus system to which the message is intended. However, in the bus system, such as one configured in accordance with Mil-Std-1553, all of the elements in the bus system receive the message sent from the bus controller 10 (as well as any other elements sending a message), but only the one whose address is included in the message responds to the message.

Each remote terminal 12 connected to the main bus 14 received the message from the bus controller directly from the main bus 14. The repeater 20 also receives the message directly from the main bus 14 and provides the message directly to remote terminal 22, which is coupled to the repeater 20, and to repeated bus 24. Repeated bus 24, which is configured in accordance with the same standard as main bus 14, provides the message directly to remote terminals 26.

In the Mil-Std-1553, there are very strict time limits by which the intended receiver, such as remote terminals 12, 22, and 26, must respond to the message sent from the message generator, such as bus controller 10. These time limits, in part, dictate the limitation of the main bus 14 to a linear topology. With the repeater 20 making the bus system extensible to elements outside of the linear topology, the repeater 20 preferably ensures that messages can be received by the elements not directly connected to the main bus 14 (i.e., remote terminals 22 and 26) in a timely manner.

Figure 3:
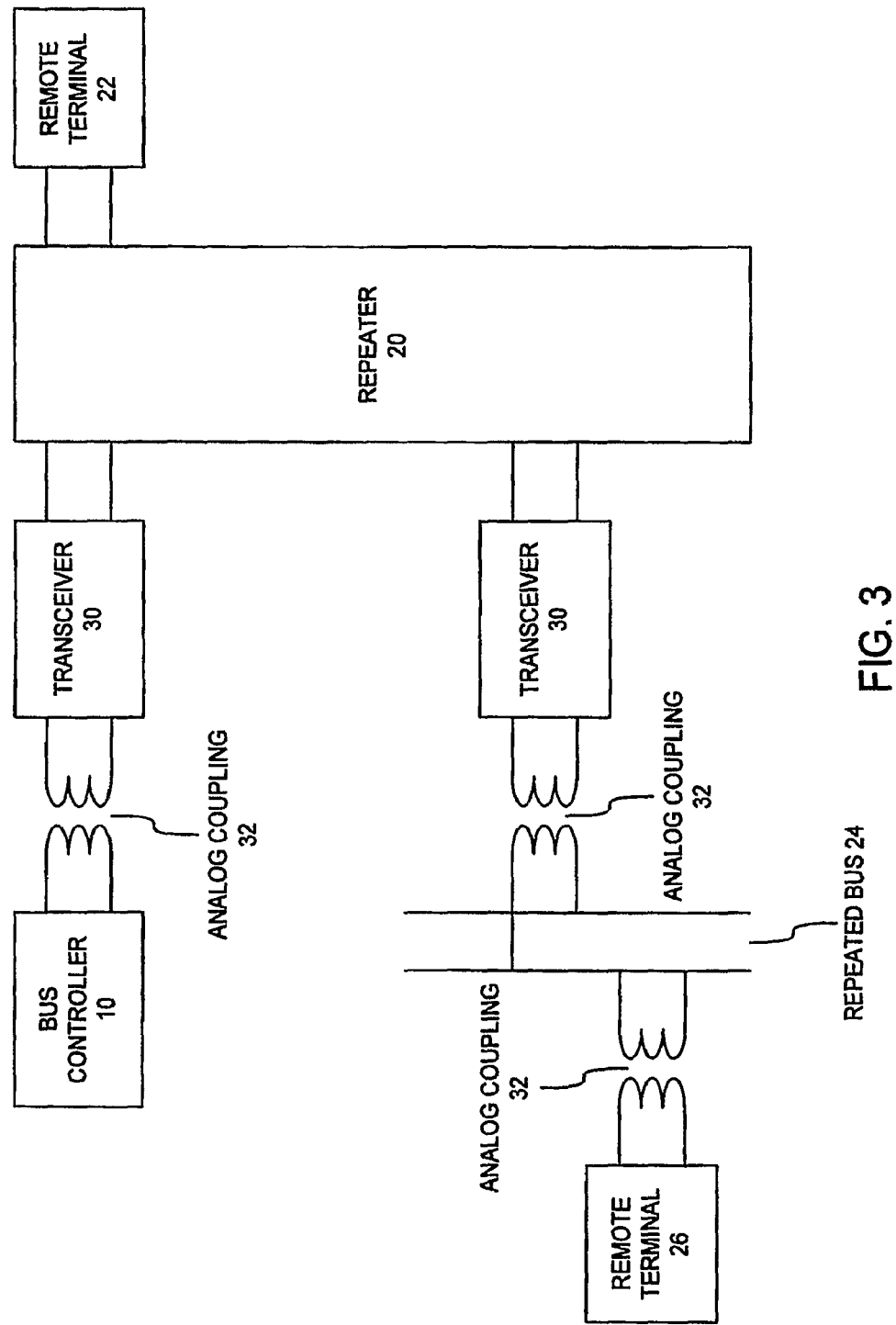
FIG. 3 is a block diagram of the bus system of FIG. 2 illustrating the analog coupling between components.

FIG. 3 is a block diagram of the bus system of FIG. 2 illustrating the analog coupling between components. As shown in FIG. 3, the repeater 20 is coupled to the bus controller 10 via a transceiver 30 and an analog coupling 32. Although not shown, each element directly coupled to the main bus 14, such as remote terminal 12, is similarly coupled to the bus controller via a transceiver 30 and an analog coupling 32. The main bus 14, when configured in accordance with Mil-Std-1553, is an analog bus, i.e., it carries analog as opposed to digital signals. The analog coupling 32 enables the repeater 20, as well as any other elements coupled to the main bus 14, to receive the analog signals carried by the main bus 14.

The transceiver 30 is configured to receive analog signals from the main bus 14 and convert the analog signals into digital signals, which are provided to the repeater 20. In addition, digital signals output from the repeater 20 are converted by the transceiver 30 into analog signals, which are provided to the main bus 14. The repeater 20 also has a transceiver 30 and an analog coupling 32 to coupled the repeater 20 to the repeated bus 24. The remote terminal 26 is also coupled to the repeated bus with a transceiver 30 (not shown) and an analog coupling 32.

The remote terminal 22 that is directly coupled to the repeater 20 can be coupled to the repeater 20 without any intervening transceiver 30 and analog coupling 32. With such a direct coupling, the signals between the repeater 20 and the remote terminal 22 can remain digital. In addition, it is possible to implement the remote terminal 22 as part of the core architecture of the repeater 20, such as implementing the repeater 20 with an FPGA, which is also configured to implement the functions of the remote terminal 22.

Figure 4:
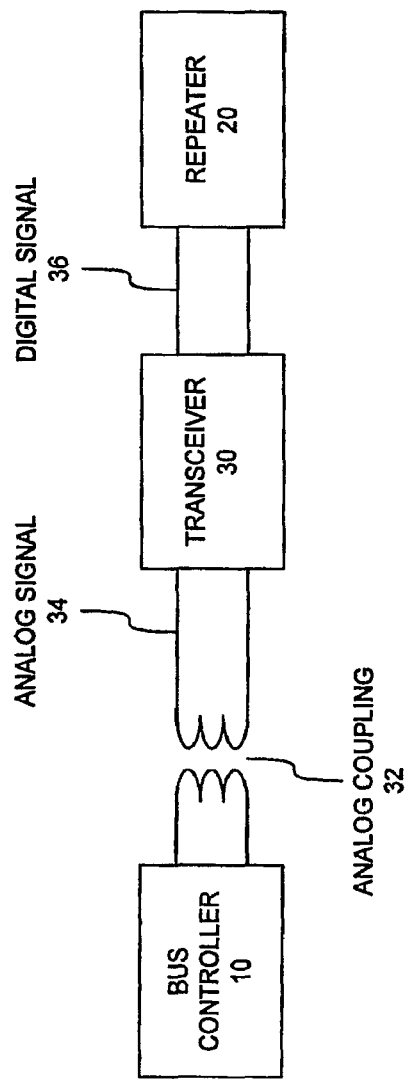
FIG. 4 is a block diagram illustrating the existence of analog and digital signals in the bus system of FIG. 2.

FIG. 4 is a block diagram illustrating the existence of analog and digital signals in the bus system of FIG. 2. As shown in FIG. 4 and described with respect to FIG. 3, the repeater 20 is coupled to the main bus 14 and the bus controller 10 with an analog coupling 32 and a transceiver 30. The analog coupling 32 provides an analog signal 34, such as a message from bus controller 10, to the transceiver 30. The transceiver 30 converts the analog signal 34 to a digital signal 36, which is received by the repeater 20. Conversely, transceiver 30 converts the digital signal 36 output from the repeater 20 into the analog signal 34.

Figure 5:
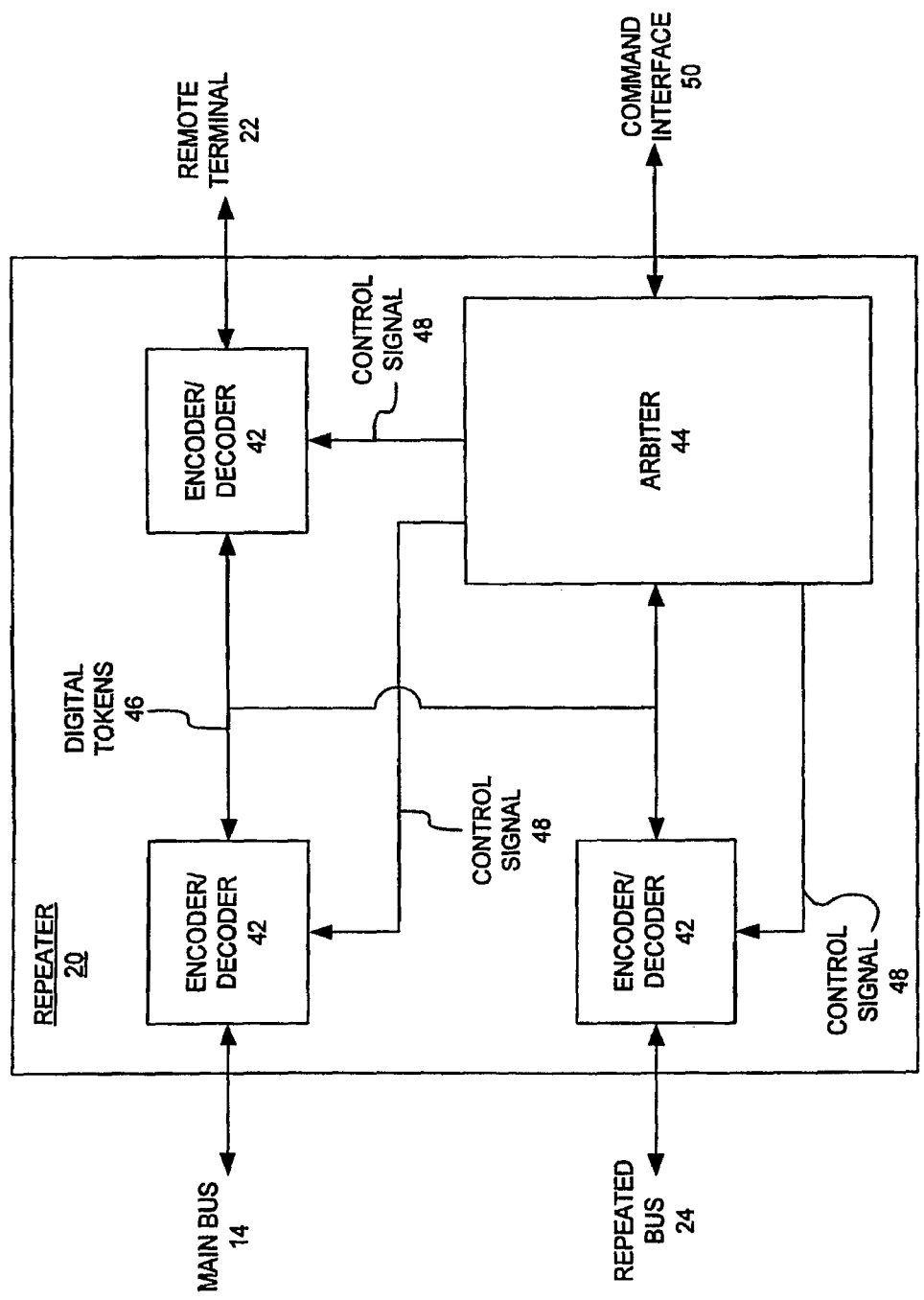
FIG. 5 is a block diagram of the repeater of the bus system of FIG. 2.

FIG. 5 is a block diagram of the repeater of the bus system of FIG. 2. As shown in FIG. 5, the repeater 20 includes a trio of encoder/decoders 42 and an arbiter 44. In particular, in this exemplary embodiment, one encoder/decoder 42 interfaces to the main bus (via a transceiver 30 not shown), one encoder/decoder 42 interfaces with remote terminal 22, and one encoder/decoder 42 interfaces with repeated bus 24. Although three are shown, it should be understood that the number of encoder/decoders 42 implemented in the repeater 20 can be decreased or increased as needed to communicate with remote terminals 22 and/or repeated busses 24.

Each encoder/decoder 42 is preferably configured to encode a received signal or message into a digital token 46 and to decode a digital token 46 into a digital signal intended for an element outside of the repeater 20. The digital tokens 46 are digital representations of messages sent by elements in the bus system that are understood by the repeater 20 and used by the arbiter 44 to control the direction (i.e., encoding or decoding) of the encoder/decoders 42. For example, if the encoder/decoder 42 coupled to the main bus 14 encodes a message from the main bus 14 into a digital token 46, the arbiter 44 receives the digital token 46 from the connection coupling the digital tokens 46 to each encoder/decoder 42 and the arbiter 44 and recognizes if the digital token 46 is a valid message. The Mil-Std-1553 has a very specific format for messages, and the arbiter can check that the digital token 46 conforms to that format to determine validity.

If the digital token 46 is a valid message, the arbiter 44 sends control signals 48 to the encoder/decoders 42 coupled to the remote terminal 22 and to the repeated bus 24 to receive and decode the digital token 46 provided from the encoder/decoder 42 coupled to the main bus 14. In response to the control signals 48, the encoder/decoders coupled to the remote terminal 22 and to the repeated bus 24 decode the digital token 46 and provide the decoded digital token 46 (i.e., the original message from the main bus 14) to the remote terminal 22 and the repeated bus, respectively. The same process applies no matter which element generates the original message. For example, messages generated by remote terminal 22 or remote terminals 26 are similarly encoded into digital tokens 46 in the repeater 20 and are received, decoded, and transmitted by the applicable encoder/decoders 42 based on control signals 48 generated by the arbiter 44.

FIGS. 6A and 6B are flow diagrams of processes for coupling messages between the main bus and remote terminals and repeated busses coupled to the main bus via a repeater, consistent with the present invention. More specifically, FIG. 6A illustrates the processing involved for messages placed on the main bus 14, and FIG. 6B illustrates the processing involved for messages placed on the repeated bus 24 and/or generated by remote terminal 22.

As shown in FIG. 6A, a message is first placed on the main bus 14 (step 602). The message can be generated by the bus controller 10, the remote terminal 12, or other element on the main bus 14. The message on the main bus 14 is received by all of the elements coupled to the main bus 14 other then the element generating the message (step 604). For example, if the bus controller 10 generates the message, it will be received by the remote terminal 12 and the repeater 20.

For the message received by the repeater 20, the message is encoded (step 606). More specifically, the message from the main bus 14 is coupled to the repeater 20 by the analog coupler 32, converted to a digital signal by the transceiver 30, and encoded into a digital token 46 by the encoder/decoder 42. The arbiter 44 receives the digital token 46 and determines whether it represents a valid message, i.e., that it conforms to a format consistent with the message standard for the main bus 14.

Based on the encoded message (i.e., the digital token), the state of each of the encoder/decoders 42 in the repeater 20 are set as receiving or transmitting (step 608). More specifically, if the digital token 46 is valid, then based on the digital token 46, the arbiter 44 generates control signals 48 to set each encoder/decoder 42 as receiving (i.e., to receive a digital token 46) or transmitting (i.e., to provide a digital token 46). In the case where the message is received from the main bus 14, the encoder/decoder 42 coupled to the remote terminal 22 and the encoder/decoder 42 coupled to the repeated bus 24 are each set to receive, whereas the encoder/decoder 42 coupled to the main bus 13 is set to transmit.

Each encoder/decoder 42 set to receive the digital token 46 decodes the received digital token 46 (step 610). The decoding of the digital token returns the message to a format understood by the standard to which the main bus 14 and repeated bus 24 conform, but still in a digital format. This digital format of the message is then provided to the element coupled to it (step 612). For example, the message from the main bus 14 would be provided to the remote terminal 22, as well as the remote terminals 26 via the repeated bus 24.

As shown in FIG. 6B, a message from the repeated bus 24 (generated by one of the remote terminals 26) or from remote terminal 22 is received by the repeater 22 (step 620). The received message is encoded (step 622). More specifically, the message from the repeated bus 24 or the remote terminal 22 is encoded into a digital token 46 by the encoder/decoder 42. The arbiter 44 receives the digital token 46 and determines whether it represents a valid message, i.e., that it conforms to a format consistent with the message standard for the main bus 14.

Based on the encoded message, the state of each of the encoder/decoders 42 in the repeater 20 are set as receiving or transmitting (step 624). More specifically, if the digital token 46 is valid, then based on the digital token 46, the arbiter 44 generates control signals 48 to set each encoder/decoder 42 as receiving or transmitting. In the case where the message is received from the repeated bus 24, the encoder/decoder 42 coupled to the remote terminal 22 and the encoder/decoder 42 coupled to the main bus 14 are each set to receive, whereas the encoder/decoder 42 coupled to the repeated bus 24 is set to transmit.

Each encoder/decoder 42 set to receive the digital token 46 decodes the received digital token 46 (step 610). The decoding of the digital token returns the message to a format understood by the standard to which the main bus 14 and repeated bus 24 conform, but still in a digital format. This digital format of the message is then provided to the element coupled to it (step 612). For example, the message from the repeated bus 14 would be provided to the remote terminal 22 and the main bus 14.

In an embodiment of the present invention, the arbiter includes an external command interface. Through either this command interface 50 or agreed upon signaling from the bus controller 10, the repeater 20 can be configured to isolate the repeated bus 24 from the main bus 14. Through either the command interface 50 or agreed upon signaling from the bus controller 10 the repeater can be instructed to perform diagnostic tests on the repeated bus 24 to verify the repeated bus integrity while the remote terminals 26 are either disconnected from the bus or not powered. The results of such diagnostic test can be communicated to the bus controller 10 via agreed upon signaling or can be made available on the command interface 50.

In an embodiment of the present invention, the arbiter 44 prevents a reflected signal from propagating upstream from an open port.

In an embodiment of the present invention, it is possible to implement a star topology (one-to-more than one) in a system implementing the 1553 protocol. Thus, an embodiment of the present invention enables conversion of a linear topology to a star (one-to-more than one) topology.

In an embodiment of the present invention, there is an avionics serial data bus system, which by way of example only, is a 1553 data bus or any of its equivalents, including a star topology. In a further embodiment, the star topology is entirely transparent to the system with respect to the 1553 protocol.

In an embodiment of the present invention, there is an avionics serial data bus system, which by way of example only, is a 1553 data bus or any of its equivalents, wherein the system is adapted to enable communication between a controller to two separate avionics units utilizing a star topology. In a further embodiment, all communications between the two separate avionics units and the controller pass through a single CSI. In a further embodiment, the two separate avionics units are arranged in parallel with respect to the single CSI. In a further embodiment, the star topology is entirely transparent to the system with respect to the 1553 protocol.

In an embodiment of the present invention, there is an avionics system, comprising a control unit in communication with two or more avionics components via a 1553 data bus or its equivalent, the communication being in accordance with a star topology. In a further embodiment, there is a single CSI through which communications from the control unit pass through en route to two remote terminals, each of which may be connected to separate avionics components, the separate avionics components only being in communication with the control unit through the single CSI terminal.

In an embodiment of the present invention, there is a method of retrofitting an aircraft or other article of manufacture having a 1553 data bus or its equivalent (e.g., another linear topology having, for example, comparable reliability, etc.) by connecting a repeater in accordance with the present invention to a first remote terminal on the bus, to at least one of (i) convert the data bus system topology to a star/one-to-more than one topology and/or (ii) to eliminate/prevent interference in the event that a remote terminal downstream of the connected repeater becomes open as a result of, for example, disconnection of the avionics component attached to that downstream remote terminal. In a further embodiment, this retrofit is transparent to the data bus system. Embodiments of the present invention also include an article of manufacture so retrofitted.

In an embodiment of the present invention, there is a repeater, comprising a first connector adapted to connect to a 1553 data bus or its equivalent, and a second connector adapted to connect to an avionics component, wherein the repeater includes an arbiter adapted to prevent interference from the second connector, when open, from entering the data bus.

In an embodiment of the present invention, there is a repeater, comprising a first connector adapted to connect to a 1553 data bus or its equivalent, and a second connector adapted to connect to an avionics component, and a third connector adapted to connect to an avionics component, wherein the repeater is adapted to direct communication signals carried by the 1553 data bus or its equivalent entering the repeater through the first connector to the second and third connectors in a parallel or a "star" manner.

In an embodiment of the present invention, there is a method of performing an end-to-end test of the integrity of segments or sub-bus in a star topology, according to one or more of the embodiments disclosed herein or variations thereof, utilizing a jumper cable, to validate the integrity of 1553 busses. By way of example, there is a method of approaching an article of manufacture configured with one or more of the embodiments disclosed herein, obtaining an open remote terminal, placing a jumper cable on the remote terminal, initiating a built in test, and verifying the integrity of at least a segment of the system. In some embodiment, the system in which the integrity is verified is a system having a star topology.

In some embodiments of the present invention, there is an article of manufacture, for example, an aircraft, or an avionics system, etc., including a 1553 data bus or an equivalent, having a built in test unit adapted to test, end-to-end, the wiring and/or interconnects on some or all of the segments on the 1553 bus connected to a port. In some embodiments, of the present invention, this built-in-test injects a test stream of tokens in a first bus (or sub-bus) and detects the same stream of token on a corresponding second bus (or sub-bus), corresponding to the same port. In some embodiments, a jumper is utilized to facilitate testing. In some embodiments, this permits testing without the need for the avionics component to be connected/in communication with the bus. This is useful, for example, when the avionics component is a high explosive device such as an air-to-air missile, in which case it is undesirable to attach the avionics component to the bus system more than necessary.

In some embodiments of the present invention, the repeater comprises a chip or microchip.

An embodiment of the present invention allows a Mil-Std-1553 bus controller to control multiple remote terminals or sub-busses connected in a point-to-point or star topology. (Mil-Std-1553 being incorporated herein by reference in its entirety.) An embodiment of the present invention also allows for the end-to-end test of the integrity of each segment or sub-bus in the star topology with the help of a simple jumper cable, drastically reducing ground support equipment necessary to validate the integrity of 1553 busses in the field.

In some embodiments, the 1553 waveform on some or all of the ports of the repeater is tokenized in a stream of Manchester-code sub-symbols and forwarded to a port arbiter. The arbiter provides direction control for some or all ports, and forwards the stream of tokens to some or all other appropriate quiescent ports. In some embodiments, some or each port that is receiving a token stream, in turn, regenerates a properly re-timed 1553 Manchester waveform. Operation of the arbiter may be controlled via a management port.

The arbiter relies on the 1553 protocol to avoid collisions on the network. A minimum of one arbiter is implemented in the 1553 repeater, and it is possible to implement multiple arbiters, each one controlling an independent sub-net. Independent sub-nets can be established by programming, via a management port, the individual arbiters to respond on individual ports, and can be dynamically re-configured via the management port if necessary to re-configure the network topology based on the mission needs or to provide redundant network paths in case of failures.

In some embodiments, the repeater operates on 1553 waveforms, but is not limited to the baseline 1553 data rates. In some embodiments, with the appropriate front ends, the repeater can be configured for double-rate 1553 (2 Mbps) or Enhanced Bit Rate 1553 (SAE AS5652) and/or SAE As-15531, the contents of all of these standards/documents being incorporated herein by reference in their entirety. In some embodiments, the repeater operates on any avionics serial data bus.

In addition, in some embodiments, the repeater has the capability of injecting a test stream of token in either bus A or B of each port, and to detect the same stream of tokens on the other bus corresponding to the same port. This capability allows for the end-to-end testing of the wiring and interconnects on each segment of 1553 bus connected to a port by simply installing a jumper between busses A and B and commanding the repeater to perform a self test on the relevant port via its management port.

In some embodiments, the repeater is fully implemented within an FPGA and may be developed as VHDL code. In some embodiments, there is a 3-port instance of the repeater operating at MIL-STD-1553 data rates. N-port versions of the repeater can be constructed from 3-port implementation by replicating the appropriate blocks within the FPGA. Double-rate 1553 or EBR-1553 versions of the repeater can be constructed by installing the appropriate, commercially available drivers as front-ends to the FPGA and scaling the FPGA's clock frequency.

Some embodiments of the present invention provide for more complex topologies to be constructed, including point-to-point and star topologies, independently of the type of front-end and bit rate used in the individual instances of the repeater (as opposed to a mere flat bus topology (MIL-1553-Standard) or for one 1553 bus to be repeated onto another 1553 bus. For example, U.S. Pat. No. 6,212,224, the contents of which are incorporated herein by reference in their entirety, discloses joining in a single point two flat busses. In some embodiments of the present invention, the addition of a fault diagnostic and isolation capabilities to traditional 1553 bus configurations can simplify the task of validating the integrity of the bus before connecting terminals to it.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments (which can be practiced separately or in combination) were chosen and described in order to explain the principles of the invention and as practical application to enable one skilled in the art to make and use the invention in various embodiments and with various modifications suited to the particular use contemplated. It is intended that the scope of the invention be defined by the claims appended hereto and their equivalents.

What is claimed is:

1. A communication system comprising:
    a main bus that operates in accordance with a standard limited to a linear topology;
    a bus controller coupled to the main bus and configured to send and receive messages on the main bus;
    a first remote terminal coupled to the main bus and configured to send and receive messages on the main bus including the messages sent by the bus controller;
    a repeater coupled to the main bus and configured to send and receive messages on the main bus including the messages sent by the bus controller and by the first remote terminal; and
    second and third remote terminals coupled to the repeater, wherein the second and third remote terminals send and receive messages on the main bus via the repeater,
    wherein the repeater comprises:
    an arbiter;
    a first encoder/decoder unit interfacing the repeater to the main bus;
    a second encoder/decoder unit interfacing the re'eater to the second remote terminal; and
    a third encoder/decoder unit interfacing the repeater to the third remote terminal,
    wherein the arbiter is coupled to each of the first, second, and third encoder/decoder units and is configured to control the encoding and decoding by the first, second, and third encoder/decoder units.

2. The communication system of claim 1, wherein the second remote terminal is coupled directly to the repeater.

3. The communication system of claim 1, wherein the second remote terminal is coupled to the repeater via a secondary bus operating in accordance with the same standard as the main bus.

4. The communication, system of claim 1, wherein the first encoder/decoder unit is configured to decode messages received from the main bus into digital tokens and encode digital tokens received from the second encoder/decoder and the third encoder/decoder into messages for the main bus.

5. The communication system of claim 1, wherein the arbiter is configured to provide control signals to the first, second, and third encoder/decoder units to control encoding arid decoding based on messages received by the repeater.

6. The communication system of claim 1, wherein the repeater is configured to send messages received from the second remote terminal to the main bus and the third remote terminal, to send messages received from the third remote terminal to the main bus and the second remote terminal, and to send messages received from the main bus to the second and third remote terminals.

7. The communication system of claim 1, wherein the main bus operates with time division multiplexing and a half-duplex command/response protocol.

8. A method for transmitting messages in a communication system comprising a main bus that operates in accordance with a standard limited to a linear topology, the method comprising:

placing a message onto the main bus from a bus controller configured to send and receive messages on the main bus;

receiving the message at a first remote terminal coupled to the main bus and configured to send and receive messages on the main bus;

receiving the message at a repeater coupled to the main bus and configured to send and receive messages on the main bus including the messages sent by the bus controller and by the first remote terminal; and passing the message from the repeater to second and third remote terminals coupled to the repeater, wherein the second and third remote terminals send and receive messages on the main bus via the repeater, wherein the repeater comprises an arbiter, a first encoder/decoder unit interfacing the repeater to the main bus, a second encoder/decoder unit interfacing the repeater to the second remote terminal, and a third encoder/decoder unit interfacing the repeater to the third remote terminal, wherein the arbiter is coupled to each of the first, second, and third encoder/decoder units and is configured to control the encoding and decoding by the first, second and third encoder/decoder units, and the method further comprises:

encoding the message received at the repeater with the first encoder/decoder unit into a digital token;

receiving the digital token at the second encoder/decoder and at the third encoder/decoder;

decodine the digital token received by the second encoder/decoder and the third encoder/decoder into a reconstructed message with the second encoder/decoder and the third encoder/decoder, respectively; and passing the reconstructed message to the second remote terminal and the third remote terminal from the second encoder/decoder and the third encoder/decoder respectively.

9. The method of claim 8, wherein the second remote terminal is coupled directly to the repeater.

10. The method of claim 8, wherein the second remote terminal is coupled to the repeater via a secondary bus operating in accordance with the same standard as the main bus.

11. The method of claim 8, further comprising:

encoding a remote message, received at the seemed encoder/decoder into a remote digital token;

receiving the remote digital token at the first encoder/decoder and the third encoder/decoder;

decoding the remote digital token received at the first encoder/decoder into a reconstructed remote message; and passing the reconstructed remote message onto the main bus from the first encoder/decoder.

12. The method of claim 8, further comprising providing control signals to the first, second, and third encoder/decoder units from the arbiter to control encoding and decoding based on messages received by the repeater.

13. The method of claim 8, further comprising:

sending messages from the repeater that are received from the second remote terminal to the main bus and the third remote terminal;

sending messages from the repeater that are received from the third remote terminal to the main bus and the second remote terminal; and sending messages from the repeater received from the main bus to the second and third remote terminals.

14. The method of claim 8, wherein the main bus operates with time division multiplexing and a half-duplex command/response protocol.

* * * * *

UNITED STATES PATENT AND TRADEMARK OFFICE
CERTIFICATE OF CORRECTION

| | | |
|---|---|---|
| PATENT NO. | : 8,542,719 B2 | Page 1 of 1 |
| APPLICATION NO. | : 12/162510 | |
| DATED | : September 24, 2013 | |
| INVENTOR(S) | : Lassini et al. | |

It is certified that error appears in the above-identified patent and that said Letters Patent is hereby corrected as shown below:

In the Specification

In Column 2, line 26, delete "errors" and insert -- errors. --, therefor.

In Column 6, Line 60, delete "repeater 22" and insert -- repeater 20 --, therefor.

In the Claims

In Column 10, Line 35, in Claim 1, delete "re'eater" and insert -- repeater --, therefor.

In Column 10, Line 49, in Claim 4, delete "communication, system" and insert -- communication system --, therefor.

In Column 11, Line 33, in Claim 8, delete "decodine" and insert -- decoding --, therefor.

Signed and Sealed this
Eleventh Day of March, 2014

Michelle K. Lee
*Deputy Director of the United States Patent and Trademark Office*